United States Patent
Schiano

(10) Patent No.: US 7,106,427 B2
(45) Date of Patent: Sep. 12, 2006

(54) APPARATUS AND METHOD FOR MEASURING CHROMATIC DISPERSION BY VARIABLE WAVELENGTH

(75) Inventor: Marco Schiano, Turin (IT)

(73) Assignee: Telecom Italia S.p.A, Milan (IT)

( * ) Notice: Subject to any disclaimer, the term of this patent is extended or adjusted under 35 U.S.C. 154(b) by 0 days.

(21) Appl. No.: 10/509,905

(22) PCT Filed: Apr. 9, 2002

(86) PCT No.: PCT/IT02/00223

§ 371 (c)(1),
(2), (4) Date: Sep. 28, 2004

(87) PCT Pub. No.: WO03/085370

PCT Pub. Date: Oct. 16, 2003

(65) Prior Publication Data

US 2005/0179889 A1    Aug. 18, 2005

(51) Int. Cl.
*G01N 21/00*    (2006.01)
(52) U.S. Cl. .................................................. 356/73.1
(58) Field of Classification Search .............. 356/73.1; 385/123–126, 24–27; 250/225, 227.14–227.18, 250/227.23
See application file for complete search history.

(56) References Cited

U.S. PATENT DOCUMENTS

| 5,428,697 | A | 6/1995 | Dolfi |
| 6,310,993 | B1 | 10/2001 | Cao |
| 6,313,934 | B1 | 11/2001 | Fortenberry |
| 6,519,028 | B1 * | 2/2003 | Kimura et al. ............. 356/73.1 |
| 6,594,003 | B1 * | 7/2003 | Horiuchi et al. ........... 356/73.1 |
| 6,654,104 | B1 * | 11/2003 | Kimura et al. ............. 356/73.1 |

FOREIGN PATENT DOCUMENTS

| EP | 1 160 559 | 12/2001 |
| FR | 2 601 134 | 1/1988 |
| FR | 2 812 144 | 1/2002 |
| WO | 02/16901 | 2/2002 |

* cited by examiner

Primary Examiner—Tu T. Nguyen
(74) Attorney, Agent, or Firm—Andrew Wilford

(57) ABSTRACT

An apparatus and method for characterizing or measuring chromatic dispersion in an optical fiber segment. The fiber is accessed at one end with a signal generator injecting modulating pulsed signals which are reflected at the other end of the fiber, the apparatus determining the phase difference between the modulation signals and the reflected modulation signals and calculating the chromatic dispersion therefrom.

12 Claims, 1 Drawing Sheet

APPARATUS AND METHOD FOR MEASURING CHROMATIC DISPERSION BY VARIABLE WAVELENGTH

CROSS REFERENCE TO RELATED APPLICATIONS

This is a national stage of PCT/IT02/00223 filed 9 Apr. 2002.

FIELD OF THE INVENTION

The present invention relates to an apparatus for measuring Chromatic Dispersion (CD) in optical fibers, and to the related method.

BACKGROUND OF THE INVENTION

Chromatic dispersion is a particularly important characteristic of optical fibers due to the distortion effects it causes on the optical signals that propagate in fibers for telecommunications.

Such a phenomenon is, as is well known, linked to the different group velocities with which various spectral components of optical signals propagate in a fiber, for instance between an optical transmitter and receiver or a first and a second end of the fiber.

The spectral components of an optical signal, due to the different group velocities, reach the receiver at different times and determine a distortion of the received signal both in analogue transmission systems, and in digital transmission systems.

The chromatic dispersion of optical fibers, as is well known, is determined mainly by two factors, the dispersion characteristics of the material whereof the fibers are made (dependence of the refractive index of the material on frequency), and the very nature of the propagation of an optical signal in a waveguide (the so-called "waveguide dispersion").

The chromatic dispersion of optical fibers can be suitably controlled by a careful design of the profile of the refractive index of the fibers. In fact, today, optical fibers are manufactured with chromatic dispersion characteristics specifically studied to meet the requirements of the most sophisticated optical transmission systems.

As these requirements become ever more stringent, in particular for transmission systems with bit rates of 10 Gbit/s or higher, the need also increases to "characterize" the CD of the optical fibers with accuracy, not only in the factory during the product qualification stage, but also in field, for new or less recently installed systems.

Such "characterization" is indispensable in order to design and install new-generation transmission systems (with bit rates of 10 Gbit/s or higher) on recent fibers or to verify, in case of less recent systems, the possibility of supporting a higher transmission capacity.

Today, the chromatic dispersion of optical fibers is measured by means of at least three different, consolidated techniques, as described, for instance, in the ITU-T Recommendation G.650. Amongst such techniques, one of the most commonly used is is the so-called Phase Shift (or PS) technique. It consists of measuring the phase shift introduced by the optical fiber segment being measured on a sinusoidal signal that modulates an optical carrier which is made to propagate in the fiber itself. The measurement is repeated at different wavelengths of the aforesaid optical carrier and for each of them the group delay of the modulating sinusoidal signal, which is proportional to the aforesaid phase shift, is calculated.

An apparatus or instrument for measuring chromatic dispersion is, for instance, described in U.S. Pat. No. 6,313,934.

This document describes, inter ails, a methodology for measuring chromatic dispersion wherein the phase shift of the sinusoidal signal, that modulates the optical carrier, introduced by the fiber segment is measured by synchronizing, by means of absolute timing systems obtained from a GPS (Global Positioning System), appropriate devices for generating and measuring the sinusoidal signal, positioned at the ends of the fiber itself.

The prior art method entails the need to simultaneously access the two ends of the fiber to be characterized, to apply appropriate instrumentation to the two ends of the fiber and to use an absolute reference system with which to synchronize the instrumentation at the two ends of the fiber.

OBJECT OF THE INVENTION

It is the object of the present invention to provide a measuring apparatus and related method that does not necessarily require accessing the two ends of the fiber in order to perform chromatic dispersion measurements, nor require an absolute reference system to synchronize the instrumentation.

SUMMARY OF THE INVENTION

This object is achieved by an apparatus for measuring the chromatic dispersion of optical fibers which comprises an optical source able to generate optical signals at variable wavelength, a signal generator able to generate modulation signals, a modulator able to generate modulated optical signals on the basis of said optical signals and of said modulation signals and coupler able to send said modulated optical signals to a first end of said fiber. According to the invention, the signal generator comprises means able to generate impulsive electrical signals having variable amplitude, and duration and periodicity determined according to the characteristics of the fiber. The fiber comprises in correspondence with a second end a reflecting element able to reflect the modulated optical signals and to generate reflected optical signals having a reflected modulation modulated component. Comparison means associated with the first end of the fiber and is able to measure the phase difference between the modulation signals and the reelected modulation component.

The coupler comprises means able to receive said reflected optical signals. The comparison means comprises an optical receiver connected to the coupler and able to convert the reflected optical signals into electrical signals representative of the reflected modulation component. A phase comparator of the comparison means is connected to the signal generator and to the optical receiver and is able to generate an electrical signal representative of the phase difference.

Control means is associated respectively with the optical source and with the generator and is able selectively to control the wavelength of said optical signals and the characteristics of said modulation signals.

The control means can comprise computing means to calculate the chromatic dispersion (CD) of the optical fiber on the basis of the phase difference measured as the wavelength of said optical signal varies.

The method of the invention comprises the steps of:
generating optical signals at variable wavelength;
generating modulation signals shaped by impulse electrical signals having predetermined phase, variable amplitude, and having duration and periodicity determined according to the characteristics of the fiber;
modulating the optical signals with the modulation signals;
sending the optical signals modulated with the modulation signals to a first end of the fiber;
reflecting at a second end of the fiber the modulated optical signals in such a way as to obtain reflected optical signals having a reflected modulation modulated component; and
measuring in correspondence with the first end the phase difference between the modulation signal and the reflected modulation modulated component.

The method can comprise the additional step of:
calculating the chromatic dispersion of the optical fiber on the basis of the phase difference measured as the wavelength of the optical signals varies.

In particular, therefore, the object is achieved by the apparatus that allows to characterize or measure the chromatic dispersion or CD of a fiber segment accessing only one end of the fiber itself.

According to another characteristic of the present invention, the apparatus does not require absolute external reference signal, but has within it all that is necessary to determine the chromatic dispersion of the fiber being measured.

BRIEF DESCRIPTION OF THE DRAWINGS

This and other characteristics of the present invention shall become readily apparent from the following description of a preferred embodiment, given with the aid of the accompanying drawing, in which.

SPECIFIC DESCRIPTION

Figure 1:
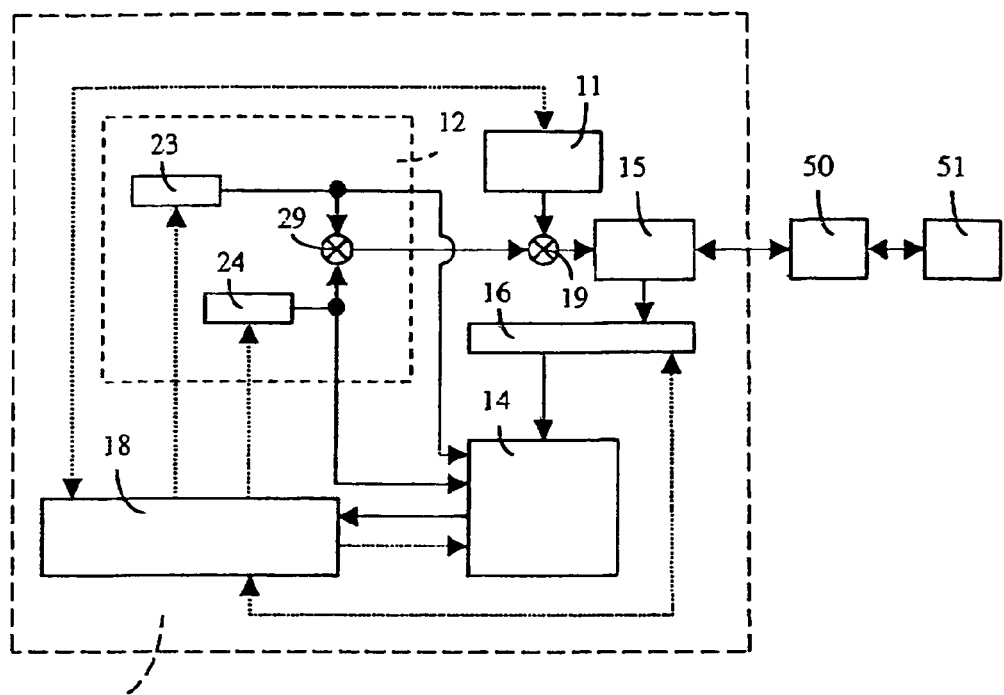
FIG. 1 shows a block diagram of the apparatus for measuring chromatic dispersion according to the invention.

With reference to FIG. 1, the apparatus or instrument 10, according to the invention, comprises a tuneable source of optical signals (optical source) 11, a device for generating modulating pulses (signal generator) 12 able to modulate the optical signals generated by the optical source 11, by means of a modulator or multiplier device 19, and a coupling device 15 able to convey the modulated optical signal on an optical fiber 50 to be subjected to characterization or analysis.

The apparatus 10 further comprises a phase comparator 14 connected at the output of an optical receiver 16 and a control processor (processor) 18 connected by means of respective control wires (shown in the figure with dashed lines) to the optical source 11, to the signal generator 12, to the phase comparator 14 and to the optical receiver 16.

The apparatus 10 is connected, by means of the coupling device 15, to a first termination of the fiber (fiber segment) 50 in correspondence with the end adjacent to the apparatus.

According to the present embodiment, the fiber segment 50 to be characterized or measured has in correspondence with the second end, in general far from the apparatus 10, a reflecting termination 51, of a known kind, constituted, for example, by a reflecting optical component, specifically connected to the end of is the optical fiber to perform the characterization, or, preferably, by a not-angled terminal connector.

The optical source 11 of the apparatus 10, known in itself, is able to generate optical signals at variable wavelength, based on commands transmitted by the processor 18 through the respective control wire and to transmit them to the modulator device (modulator) 19 to be modulated with the modulating pulses.

Figure 2:
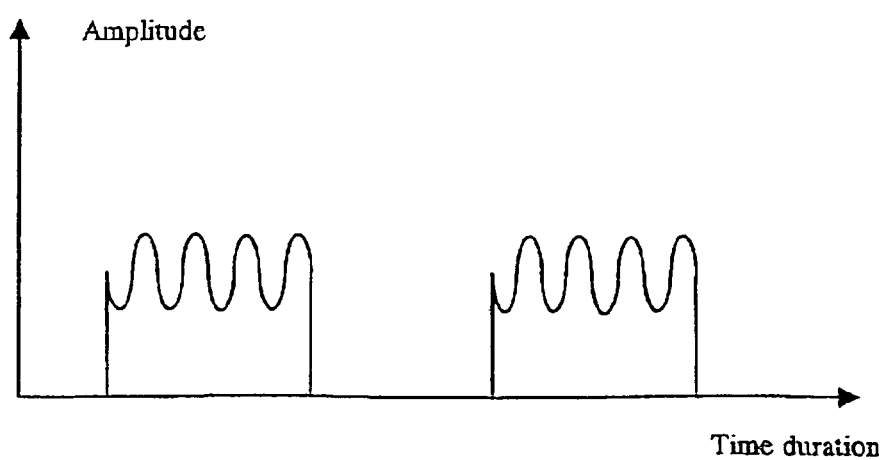
FIG. 2 shows an example of impulsive signal used in the apparatus of FIG. 1 to measure chromatic dispersion.

The signal generator 12. comprises a generator of sinusoidal signals (sinusoidal generator) 23, a generator of impulse signals (impulse generator) 24 and an associated multiplier device 29, known in themselves, and is able to generate the product of the aforesaid sinusoidal signal and of the impulse signal and to send them to the modulator 19 as modulation signals of the kind shown by way of example in FIG. 2.

In particular, the modulation signals (modulating) are shaped by pulses of determined duration and periodicity in which the pulses themselves have their amplitude variable in sinusoidal fashion about a reference level.

Both the sinusoidal generator 23 and the impulse generator 24 are controlled by means of respective control wires by the processor 18 to enable varying both the characteristics of the sinusoidal signals and of the impulses.

Moreover, both the sinusoidal generator 23 and the impulse generator 24 are connected, by means of respective connections, to the phase comparator 14 and are able to transmit the respective signals to the comparator 14 itself.

The coupling device 15, known in itself, for instance constituted by a directional coupler or by an optical circulator, is able to collect the modulated optical signal coming from the multiplier 19 and to send it to the optical fiber 50 through the first termination.

The coupling device 15 is also able to collect the signals reflected back by the reflecting termination 51 and to send them, through a corresponding optical connection, to the optical receiver 16.

The optical receiver 16, of a known kind, has its input connected to the coupling device 15 and the output connected to the phase comparator 14 and it is able to detect the signals reflected back and to convert them into electrical signals able to be measured by the phase comparator 14.

The phase comparator 14, of a known kind, is able to measure the phase difference between the signal coming from the sinusoidal generator 23 and the one received by the optical receiver 16 through the fiber segment 50.

In particular, the phase comparator 14 is able to measure the phase difference between the continuous sinusoidal signal, generated by the sinusoidal generator 23, and the pulsed sinusoidal signal reflected back, received by the optical receiver 16 and to transmit such information, through a corresponding connection, to the processor 18.

The processor 18, of a known kind, is able, on the basis of programs developed during the design of the apparatus 10, to control the different devices of the instrument 10, and in particular the optical source 11, the impulse generator 24, the sinusoidal generator 23, the phase comparator 14 and the optical receiver 16 and to calculate and display the results of the measurements of the phase difference and group delay as a function of wavelength, based on the information from the phase comparator 14.

In particular, the processor 18 is able to adjust the duration and repetition frequency of the pulses generated by the pulse generator 24 on the basis of the characteristics of the fiber segment 50 being measured, such as length, presence of any intermediate connectors between the first termination and the reflecting termination 51, etc.

The duration of the impulses (FIG. 2), for instance, is determined by the processor 18 (FIG. 1, FIG. 2) in such a way that it is no greater than twice the time of propagation of the pulses themselves in the fiber segment 50 being measured. In the same way, the periodicity or repetition period of the impulses, for instance, is determined by the processor 18 in such a way that it is no less than 4 times the propagation time between the two ends in the fiber segment 50 being measured.

The conditions indicated above for the duration of the impulses and the repetition period of the impulses themselves are, as the person skilled in the art will readily comprehend, such as to allow the phase comparator 14 to selectively measure the phase difference between the sinusoidal signal generated by the sinusoidal generator 23 and the sinusoidal signal reflected by the reflecting termination 51.

The processor 18 is also able to inhibit the operation of the phase comparator 14, by means of the respective control connection, during the reflections from all optical connectors (including the connector at the first termination) present in the fiber segment 50 being measured. This inhibition, in particular, is effected in synchrony with the impulses generated by the impulse generator 24 thanks to the connection between the pulse generator 24 itself and the phase comparator 14.

The processor 18 is also able to control the optical receiver 16, by means of the respective control connection, adjusting some operating parameters such as gain, bandwidth, etc., according to the characteristics of the signals received by the optical receiver 16 itself.

The operation of the apparatus 10 according to the invention is as follows.

The modulated optical signal, generated by means of the combination of the signals coming from the optical source 11 and of the signal generator 12 (FIG. 2) is sent to the first end of the fiber 50 through the coupling device 15 and propagates to the opposite end of the fiber where it is reflected by the reflecting termination 51 and returns to the coupling device 15.

The coupling device 15 sends the optical signal reflected by the reflecting termination 51 to the optical receiver 16, where it is converted into an electrical signal and transmitted to the phase comparator 14 for the measurement of the phase difference between the sinusoidal signal generated locally by the sinusoidal generator 23 and the one reflected by the reflecting termination 51.

The phase shift between the two sinusoidal signals is proportional, as is well known, to the group delay of the fiber 50 at the working wavelength of the optical source 11 and, therefore, by repeating the operations described above with a determined number of optical signals of various wavelengths it is possible to calculate, in a known manner, by means of the processor 18, the chromatic dispersion CD of the fiber segment 50.

Thanks to a first characteristic of the present invention, the apparatus or instrument 10 allows certifying or measurement of the chromatic dispersion CD of a fiber segment 50 accessing a single end of the fiber 50 itself.

This considerably simplifies and abbreviates the measuring procedure.

Moreover, the measurements can be performed, at least in the case in which the fiber 50 is terminated at the second end with a not-angled connector, by a single operator instead of two as is the case with known instruments.

According to an additional characteristic of the present invention, the reference signal for measuring the phase difference is available inside the instrument and need not be obtained from a GPS receiver as in the known case taken as a reference.

The invention was described taking as reference impulse modulation signals, variable in amplitude in sinusoidal fashion, but, as a person versed in the art will readily comprehend, the amplitude variations of the impulse signals can have any shape, for instance triangular or square, as long as they are such as to allow a phase shift measurement between the generated signal and the reflected signal.

Obvious modifications or variations are possible to the above description, in the dimensions, shapes, materials, components, circuit elements, connections and contacts, as well as in the details of the circuitry and of the illustrated construction and of the method of operation, without thereby departing from the spirit of the invention as specified in the claims that follow.

The invention claimed is:

1. An apparatus for measuring the chromatic dispersion of an optical fiber having first and second opposite ends, the apparatus comprising:
    an optical source able to generate optical signals at a variable wavelength;
    a signal generator able to generate modulation signals;
    a modulator able to generate modulated signals on the basis of the optical signals and of the modulation signals;
    a coupling device able to send the modulated signals to the first end of the fiber;
    an impulse generator in the signal generator and able to generate impulsive electrical signals having variable amplitude and having duration and periodicity determined according to characteristics of the fiber such that the modulated signals are shaped by pulses having variable amplitude;
    a reflecting element at the second end of the fiber able to reflect the modulated signals and to generate reflected optical signals having a reflected modulated component; and
    a comparator associated with the first end of the fiber and able to measure a phase difference between the modulation signals and the reflected modulated component.

2. The apparatus defined in claim 1 wherein the coupling device is further able to receive the reflected optical signals and the comparator comprises
    an optical receiver connected to the coupling device and able to convert the reflected optical signals into electrical signals representative of the reflected modulated component; and
    a phase comparator connected to the signal generator and to the optical receiver and able to generate an electrical signal representative of the phase difference.

3. The apparatus defined in claim 2 further comprising
    a processor associated with the optical source and with the signal generator and able selectively to control the wavelength of the optical signals and the characteristics of the modulation signals.

4. The apparatus defined in claim 3 wherein the processor is further able to calculate the chromatic dispersion of the optical fiber on the basis of the phase difference measured as the wavelength of the optical signal varies.

5. The apparatus defined in claim 1 wherein the amplitude of the pulses is variable in sinusoidal fashion.

6. The apparatus defined in claim 1 wherein a duration of the pulses is no greater than twice a time of propagation of the pulses in the fiber.

7. The apparatus defined in claim 1 wherein a periodicity of the pulses is no less than four times a time of propagation of the pulses in the fiber.

8. A method for measuring the chromatic dispersion of an optical fiber having first and second opposite ends, the method comprising the steps of:

generating optical signals at variable wavelength;

generating modulation signals shaped by impulse electrical signals having predetermined phase, variable amplitude, and duration and periodicity determined according to characteristics of the fiber;

modulating the optical signals with the modulation signals such that the optical signals modulated with the modulation signals are shaped by pulses having variable amplitude;

sending the modulated signals to the first end of the fiber;

reflecting at the second end of the fiber the modulated signals in such a way as to obtain reflected optical signals having a reflected modulated component;

measuring at the first end a phase difference between the modulation signal and the reflected modulated component.

9. The method as claimed in claim 8 further comprisign the step of calculating a chromatic dispersion of the optical fiber on the basis of a phase difference measured as a wavelength of the optical signals varies.

10. The method defined in claim 8 wherein an amplitude of the pulses is variable in sinusoidal fashion.

11. The method defined in claim 8 wherein a duration of the pulses is no greater than twice a time of propagation of the pulses in the fiber.

12. The method defined in claim 8 wherein a periodicity of the pulses is no less than four times a time of propagation of the pulses in the fiber.

* * * * *